United States Patent
Subramanian

(10) Patent No.: US 8,172,051 B2
(45) Date of Patent: May 8, 2012

(54) FRICTION MATERIAL FOR BRAKES

(75) Inventor: Vijay Subramanian, Murfeesboro, TN (US)

(73) Assignee: Federal-Mogul Products, Inc., Southfield, MI (US)

( * ) Notice: Subject to any disclaimer, the term of this patent is extended or adjusted under 35 U.S.C. 154(b) by 825 days.

(21) Appl. No.: 12/245,253

(22) Filed: Oct. 3, 2008

(65) Prior Publication Data

US 2010/0084233 A1   Apr. 8, 2010

(51) Int. Cl.
*F16D 69/00* (2006.01)
(52) U.S. Cl. .................. 188/251 M; 188/251 A
(58) Field of Classification Search ............. 188/251 A, 188/251 M; 192/107 M; 428/66.2; 523/149
See application file for complete search history.

(56) References Cited

U.S. PATENT DOCUMENTS

| | | | |
|---|---|---|---|
| 4,944,373 A | 7/1990 | Ohya et al. | |
| 6,194,059 B1 | 2/2001 | Yesnik | |
| 6,220,404 B1 * | 4/2001 | Hara et al. | 188/251 A |
| 6,220,405 B1 | 4/2001 | Kesavan et al. | |
| 6,451,872 B1 * | 9/2002 | Yamane | 523/156 |
| 6,482,519 B1 | 11/2002 | Schleifstein | |
| 6,497,307 B1 | 12/2002 | Schoo et al. | |
| 6,579,920 B2 | 6/2003 | Burnett et al. | |
| 6,617,375 B2 | 9/2003 | Kobayashi et al. | |
| 6,635,349 B2 | 10/2003 | Horiya et al. | |
| 6,656,240 B2 | 12/2003 | Chiba | |
| 6,887,549 B2 | 5/2005 | Suzuki et al. | |
| 7,097,009 B2 | 8/2006 | Shao et al. | |
| 7,205,049 B2 | 4/2007 | Andrews | |
| 7,294,188 B2 | 11/2007 | Shao et al. | |
| 7,297,728 B2 * | 11/2007 | Yamamoto et al. | 523/149 |
| 7,914,871 B2 * | 3/2011 | Unno | 428/66.2 |
| 2002/0033315 A1 * | 3/2002 | Yamane | 192/107 M |
| 2002/0086159 A1 | 7/2002 | Horiya et al. | |
| 2003/0018118 A1 | 1/2003 | Burnett | |
| 2003/0026969 A1 * | 2/2003 | Nagata et al. | 428/292.1 |
| 2003/0049426 A1 | 3/2003 | Kobayashi et al. | |
| 2004/0140167 A1 * | 7/2004 | Shao et al. | 188/251 A |
| 2004/0146702 A1 | 7/2004 | Shao et al. | |
| 2004/0241429 A1 * | 12/2004 | Suzuki et al. | 428/329 |
| 2005/0014862 A1 | 1/2005 | Kusaka et al. | |
| 2006/0151268 A1 * | 7/2006 | Kesavan et al. | 188/251 A |
| 2007/0142500 A1 | 6/2007 | Shao et al. | |
| 2008/0035025 A1 | 2/2008 | Andrews | |

FOREIGN PATENT DOCUMENTS

| | | |
|---|---|---|
| JP | 2002138273 | 5/2002 |
| JP | 2003322183 | 11/2003 |
| KR | 10-0149747 B1 | 12/1996 |
| KR | 2020080002748 U | 7/2008 |

* cited by examiner

*Primary Examiner* — Christopher Schwartz
(74) *Attorney, Agent, or Firm* — Robert L. Stearns; Dickinson Wright PLLC

(57) ABSTRACT

A non-asbestos friction material includes at least one binder, fiber, lubricant, abrasive and titanate in a range of volume fractions in combination with other materials such as fillers and is substantially free of copper and asbestos.

33 Claims, 1 Drawing Sheet

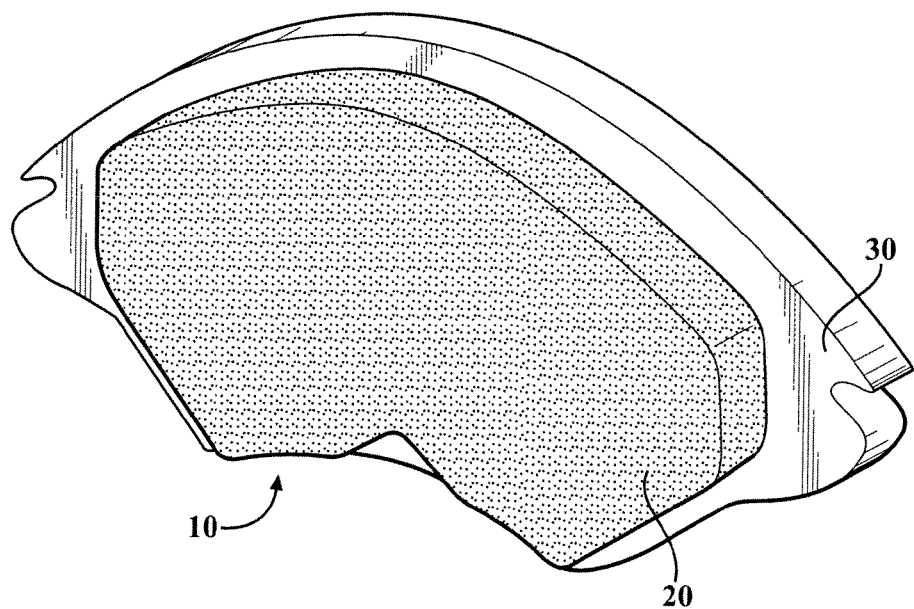

FRICTION MATERIAL FOR BRAKES

FIELD OF THE INVENTION

The present invention relates to a non-asbestos friction material and in particular to a friction material for a brake pad to be used for brakes of vehicles or industrial machines.

BACKGROUND OF THE INVENTION

Copper in non-asbestos-based friction materials provides many useful properties and performance characteristics including excellent reinforcing strength, increased friction coefficient at high temperatures and excellent heat transfer properties. In addition, copper provides many other qualities that which increases the longevity of the friction material and the components the friction material engages as well as reduces brake dust. Steel fibers are sometimes used in place of some of the copper, but do not have many of the positive attributes of copper and are more frictionally aggressive, thereby increasing the amount of wear on the rotor against which the friction material engages. Steel fibers also generate dust that can quickly and permanently stain the surface finish of the rims of a vehicle.

SUMMARY OF THE INVENTION

The present invention is directed to a non-asbestos friction material that is free of copper and copper alloys. The inventive compositions are unique in that they provide the same level of friction, pad life, noise and other performance characteristics of a typical non-asbestos NAO or that uses copper based materials, while employing neither of copper nor copper-containing materials. The compositions provide a family of outstanding friction materials that possess the desirable performance attributes of a copper-containing friction material, but without the use of copper or copper alloys.

According to a further aspect of the invention a friction material for a brake has at least one binder forming approximately 12-24% by volume, at least one fiber forming 2-10% by volume, at least one lubricant forming less than 5% by volume, at least one abrasive forming 15-30% by volume, at least one titanate forming 10-24% by volume and the material is substantially free of copper in any form.

According to a further aspect of the invention the binder comprises a mixture of one or more straight or modified phenolic resin systems, including an unmodified phenolic resin.

According to a further aspect of the invention, the at least one fiber is selected from a group of aramid, polyacrylonitrile (PAN) and cellulose fibers. The fiber may be of the aramid fiber family only.

According to still a further aspect of the invention, the at least one lubricant comprises at least one of metal sulfides, organic lubricants and metal lubricants. The lubricant may be selected from the group consisting essentially of tin sulfides, atimony trisulfide, antimony trioxide, zinc sulfide, copper sulfide, iron sulfides, phthalocyanine, tin powder, and zinc powder. The lubricant may be a combination of lubricants, such as a metal sulfide and antimony trisulfide.

According to yet a further aspect of the invention, the at least one abrasive consists essentially of at least one of hard mineral fibers, zirconia, zircon, zirconium silicate, mica, alumina, ceramic fibers, calcium magnesium silicate, calcium magnesium zirconium silicate, calcium magnesium aluminum silicate, magnesium aluminum silicate, synthetic mineral fibers such as hardwool, slagwool and rockwool, silica, silicon dioxide, sand, silicon carbide, iron oxide and magnesium oxide.

The friction material may include other materials forming the balance of the material. The other materials may include at least one material selected from the group consisting of lime, calcium oxide, talc, calcium carbonate, calcium silicate, wollastonite, barites, carbons such as graphite and petroleum coke, rubber such as rubber powder or recycled rubber crumbs and various types of friction dusts. A combination of the materials listed above may be used, such as a mixture of lime, barium sulfate, graphite, wollastonite and friction dusts.

BRIEF DESCRIPTION OF THE DRAWING

The present invention will become more fully understood from the accompanying detailed description, claims, and the drawing in which:

FIG. 1 is a perspective view of an exemplary friction material incorporated into an exemplary brake pad.

DETAILED DESCRIPTION OF THE PREFERRED EMBODIMENTS

Disclosed is a non-asbestos friction material for brake pads and other brake materials that includes at least one binder, at least one fiber, at least one lubricant, at least one abrasive, at least one titanate and which is substantially free of copper including brass and bronze.

The friction material 20 may be used in the exemplary brake pad 10 illustrated in FIG. 1. The brake pad 10 illustrated in FIG. 1 is only an exemplary brake pad and may take on any size, shape or configuration. The friction material 20 when used in a brake pad 10 is typically bonded or otherwise secured to a backing plate 30.

While some prior efforts have been made to try at least partially remove copper or copper alloys from friction pad compositions, it has not known to have been successful without sacrificing desirable performance.

The non-asbestos friction material of the invention includes the at least one binder which may comprise a phenolic resin of either straight or modified phenolic resin form. Examples of modified binders include silicone, acrylic, epoxy, and nitrile. The binder makes up approximately 12-24% by volume of the total composition. The binder serves as a matrix that holds the other ingredients together in the friction material. The binder system may also comprise a mixture of two or more types of binders, at least one of which is a phenolic type binder if desired for a particular application to achieve a desired performance characteristic.

The at least one fiber makes up approximately 2-10% by volume of the total friction material composition. The fibers may be chosen from aramid fibers, poly acrylonitrile (PAN) fibers, and cellulose fibers. Aramid fibers preferably have an average length of 1.09 mm with an approximate range of 0.92 mm to 1.26 mm. PAN fibers have a length range of about 5.0 to 7.5 mm. Cellulose fibers have a length less than 1 mm. The fibers provide integrity and structural strength to the friction material. Fibers also help with stability of pre-cured preforms during the manufacturing process. Various fibers and fiber lengths can thus be used to control manufacturing and performance characteristics of the friction material. The libers can be synthetic or natural in origin, and pure or recycled in form.

The at least one lubricant is included in the friction material to reduce pad and disc wear during service. The at least one lubricant makes up less than or equal to 5% by volume of the total friction material composition. Candidate lubricant materials include metal sulfides, organic lubricants, metal lubricants or a combination thereof. Examples of metal sulfides include, but are not limited to, tin sulfides, antimony trisulfide, antimony trioxide, zinc sulfide, and iron sulfide. An example of an organic lubricant is phthalocyanine and examples of metal lubricants include tin and zinc powders. Metal sulfides include metal sulfide complexes such as those having tin sulfide as one of the main ingredients.

The at least one abrasive makes up approximately 15-30% by volume of the total friction material composition. Abrasives are typically classified by their Mohs hardness. Examples of candidate abrasives include mineral fibers, zirconia, alumina, magnesium oxide, zirconium silicate, silica, silicon dioxide, sand, silicon carbide, mullite, iron oxide, complex mineral silicates such as calcium magnesium silicate, calcium magnesium zirconium silicate, calcium magnesium aluminum silicate, magnesium aluminum silicate, iron oxides of different chemistries, other metallic oxides, synthetic mineral fibers such as hardwool, slagwool and rockwool, and several naturally occurring minerals. The hard abrasives—those with higher values on the Mohs hardness scale—should be used in low concentrations while the mild abrasives—those with lower values on the Mohs hardness scale—may be used in higher concentrations to achieve the same desired friction level.

The at least one titanate makes up approximately 10-24% by volume of the total friction material composition. Titanates provide high temperature stability that is comparable to asbestos-type materials. Titanate materials, available in hexatitanate and octatitanate forms, coat the rotor surface with a uniform and consistent transfer layer. Titanates may include compounds such as potassium titanate, magnesium potassium titanate, lithium potassium titanate calcium potassium titanate, and other hexa and octa-titanates. Of the two categories of titanates, hexatitanates are preferred.

The friction material may also be formed with a limited amount of magnesium oxide (MgO), typically less than 10% by volume, preferably less than 5% by volume and more preferably is substantially free of magnesium oxide. The friction material is also preferably substantially free of steel fibers.

The other ingredients included in the friction material form the balance of the composition and are classified generally as fillers and/or modifiers. The other ingredients make up approximately 7-61% of the total composition of the friction material. The other ingredients generally provide bulk to the formulation, reduce cost, provide noise reduction and help with coating the rotor surface with a uniform transfer layer. Examples of suitable fillers include lime, calcium oxide, barytes, including barium sulfate, graphite, pet coke, desulfurized coke, calcium silicate, rubber including various powder rubbers and recycled rubber and friction dust including brown, black, straight, modified or other grades of friction dust.

The following tables provide exemplary friction materials prepared using the present invention that have sufficient performance characteristics. Each of the examples is evaluated for certain manufacturing characteristics including mixing, preforming, pressing, physical hardness, physical compression, bonding to back plate at room temperature, bonding to back plate at 300° C.; as well as certain performance characteristics including friction pad life, pad wear, rotor wear characteristics and costs. All compositions described below are expressed in volume % and have been rounded off to the nearest whole number for simplicity.

The friction materials of the Examples were processed and formed by mixing, pressing and curing operations typically used in the industry to make brake pad friction materials. This involves dry tumble mixing the ingredients with optional use of plows and choppers to blend the ingredients into a homogeneous mixture. The mix is pressed into preforms or pucks using a room temperature press operation. The pucks are then placed into a hot mold with a metal backplate on one side and hot press cured to bond the cured friction material to the backing plate to form the final brake pad. Samples for testing pads bound for market would further undergo a post bake operation as well as one or more finishing operations before being packaged for commercial sale. The samples of Examples 1-13 were post baked. Variations in the process may include loose filling the mix into the pressing mold directly or by use of a liquid binder system. The friction material may be attached directly to the backplate or with use of an underlayer material, as is well known in the industry.

EXAMPLE 1

| | |
|---|---|
| Binder | 18 |
| Fiber | 5 |
| Lubricant | 1 |
| Total Abrasives | 23 |
| Titanates | 16 |
| Fillers | 37 |
| Copper and Copper alloys | 0 |
| Total | 100 |

The ingredients of Example 1 were blended in a standard tumble mixer for approximately 7 minutes and then preforms were made and hot press cured to a metal backing as described above. The friction material of Example 1 was found to have good all-around manufacturing and performance characteristics described above comparable to friction formulations containing copper or copper alloys in them. The remaining examples were made by the same process as Example 1.

EXAMPLE 2

| | |
|---|---|
| Binder | 12 |
| Fiber | 5 |
| Lubricant | 1 |
| Total Abrasives | 23 |
| Titanates | 16 |
| Fillers | 43 |
| Copper and Copper alloys | 0 |
| Total | 100 |

The final friction composition of Example 2 showed some undesirable negative characteristics. The pads were extremely soft, with high compressibility numbers. The press pressure required to achieve acceptable material densities were almost twice as high as the second worst material in this study. The bond retention of the material to the back plate was subpar at 300° C. testing. The pads also showed tendency for end lifting of the material off the backing during the post bake operation, showing that the binder level was too low to provide sufficient pad integrity. It is believed that a binder level below 12% by volume significantly impairs the compressibility and bonding characteristics of the friction material and thus should be kept at or above 12%.

EXAMPLE 3

| | |
|---|---|
| Binder | 24 |
| Fiber | 5 |
| Lubricant | 1 |
| Total Abrasives | 23 |
| Titanates | 16 |
| Fillers | 31 |
| Copper and Copper alloys | 0 |
| Total | 100 |

Some variations in Example 3 as compared to Example 1 include extremely low void volumes in the pad. Generally a very desirable characteristics for brake pads is that the noise levels be low since the noise from braking is a common cause of customer complaints related to braking systems. Low level voids also correlate to very stiff pads with very low compressibility values. This material showed the lowest compressibility properties of all the examples tested, demonstrating that the high resin binder level affects this property. As opposed to Example 2, the bonding to the back plate both at room temperature and at 300° C. was excellent, and very low press pressures were required to get acceptable pad integrities, but due to the low compressibility and in particular the low voids potentially causing noise, a binder level above 24% by volume of the friction material would be undesirable. Therefore, it is believed that 24% of binder by volume is the maximum level of binder that may be used in a volume percent of the final friction composition.

EXAMPLE 4

| | |
|---|---|
| Binder | 18 |
| Fiber | 2 |
| Lubricant | 1 |
| Total Abrasives | 23 |
| Titanates | 16 |
| Fillers | 40 |
| Copper and Copper alloys | 0 |
| Total | 100 |

Example 4 reduces the fiber content to 2% by volume. In comparison to the friction material of Example 1, the pad was difficult to preform and had low physical compression as well and was somewhat difficult to bind to the back plate at 300° C. The cured friction material was unacceptably brittle. Therefore, the pads should include more than 2% and preferably 3% or more by volume fiber to provide acceptable performance characteristics.

EXAMPLE 5

| | |
|---|---|
| Binder | 18 |
| Fiber | 10 |
| Lubricant | 1 |
| Total Abrasives | 23 |
| Titanates | 16 |
| Fillers | 32 |
| Copper and Copper alloys | 0 |
| Total | 100 |

The material of Example 5 employed a high level of fiber which produced good performance characteristics but some process difficulties. During processing, the high level of fiber made this material difficult to mix, but dividing the mix into smaller batches helped. However, smaller batches would significantly increase the cost of manufacturing of the material and thus would be undesirable. Therefore, the friction material should have less than 10% by volume of fibers in the total composition and more particularly, approximately 3-8% by volume of the total composition.

EXAMPLE 6

| | |
|---|---|
| Binder | 18 |
| Fiber | 5 |
| Lubricant | 0 |
| Total Abrasives | 23 |
| Titanates | 16 |
| Fillers | 38 |
| Copper and Copper alloys | 0 |
| Total | 100 |

In Example 6, the level of lubricants was reduced to zero. Even without the lubricants, it was found that the preforming and pressing operations were smooth. Final brake pad also showed acceptable levels of friction and other performance characteristics.

EXAMPLE 7

| | |
|---|---|
| Binder | 18 |
| Fiber | 5 |
| Lubricant | 5 |
| Total Abrasives | 23 |
| Titanates | 16 |
| Fillers | 33 |
| Copper and Copper alloys | 0 |
| Total | 100 |

In Example 7, the amount of lubricant was increased to 5% by volume. These pads showed the second lowest compressibility among all examples tested, demonstrating that high levels of lubricants negatively affect compressibility. The friction material should thus have less than 5% by volume of the lubricant in the final composition, and preferably under 4% by volume of the total friction material composition.

EXAMPLE 8

| | |
|---|---|
| Binder | 18 |
| Fiber | 5 |
| Lubricant | 1 |

| | |
|---|---|
| Total Abrasives | 15 |
| Titanates | 16 |
| Fillers | 45 |
| Copper and Copper alloys | 0 |
| Total | 100 |

The friction material of Example 8 had relatively lower levels of abrasive material. This material processed very easily both during performing and press curing stages. The friction performance characteristic was marginally acceptable in this case, suggesting lowering of the abrasive level further would negatively impact the friction performance of the formulation. This material had the second lowest level of friction coefficient measured among all tested examples, better only than the friction material of Example 3. However, at this lower level, it is believed that abrasives can be selected from those having higher Mohs hardness levels to improve friction to acceptable levels, but the hardest of the abrasives might cause scoring of the rotor surface during application. Therefore, it is believed that the total amount of abrasives should at least be greater than 15% by volume of the final composition.

EXAMPLE 9

| | |
|---|---|
| Binder | 18 |
| Fiber | 5 |
| Lubricant | 1 |
| Total Abrasives | 30 |
| Titanates | 16 |
| Fillers | 30 |
| Copper and Copper alloys | 0 |
| Total | 100 |

The friction material of Example 9 increased the level of abrasive materials to 30%. The preforming and process characteristics were good. Both pad wear and rotor wear were the second highest in the examples tested. It is possible to use milder abrasives at these higher levels to help offset some of these negative influences, however there still remains the downside of the high cost of using a high volume fraction of the friction material. Accordingly, a friction material having approximately 30% or less abrasives is preferred to minimize wear performance and cost, even though the friction material may have otherwise acceptable performance and processing characteristics.

EXAMPLE 10

| | |
|---|---|
| Binder | 18 |
| Fiber | 5 |
| Lubricant | 1 |
| Total Abrasives | 23 |
| Titanates | 10 |
| Fillers | 43 |
| Copper and Copper alloys | 0 |
| Total | 100 |

The friction material of Example 10 had the lowest level of titanate materials of all Examples. This material processed and performed very well in all aspects. However, the friction level variation within a single test was the highest for this material. The difference between the highest and lowest friction coefficients under the numerous conditions of the test for this formulation was 0.22, while the best candidate (Example 11) showed a range in coefficient of friction of only 0.08. It is thus shown that the titanate materials fail to work as friction stabilizers at levels of 10% by volume or less.

EXAMPLE 11

| | |
|---|---|
| Binder | 18 |
| Fiber | 5 |
| Lubricant | 1 |
| Total Abrasives | 23 |
| Titanates | 24 |
| Fillers | 29 |
| Copper and Copper alloys | 0 |
| Total | 100 |

The friction material in Example 11 had the highest level of titanate materials of all Examples. This material processed and performed very well in all aspects. The friction level variation within a single test was the lowest for this material, at 0.08. The negative aspect of using high levels of titanates is cost. Thus, it is advantageous to use titanates at a level of 24% by volume or less for achieving the performance targets outlined in this invention on a commercial basis.

EXAMPLE 12

| | |
|---|---|
| Binder | 24 |
| Fiber | 10 |
| Lubricant | 5 |
| Total Abrasives | 30 |
| Titanates | 24 |
| Fillers | 7 |
| Copper and Copper alloys | 0 |
| Total | 100 |

The friction material of Example 12 is unique in that the material used high levels of all constituents. The binder was at 24%, fibers at 10%, lubricants at 5%, abrasives at 30%, and titanates at 24%. This resulted in the filler materials—the rest of the chemicals in the formulation being dropped to 7%. This material was the worst of all materials tested for both processing and performance. The bulk of the material was higher than Example 5, and the mixing volume had to be cut down to process the material successfully. The material had very low compressibility and almost no retention to backplate at 300 C bond testing. The pad wear and rotor wear was extremely high, with total weight loss of the pads and the rotors adding up to well more than 3 times the best candidate tested. The material also showed end lift after the performance testing. It is believed to be virtually impossible to make a good friction material at these low levels of other ingredients. The next lowest level of filler materials would come from Example 11, which used 29% of filler material. This Example 11 formulation performed well overall, and it may be possible to go to an intermediate level between 7 and 29 and still achieve acceptable performance.

EXAMPLE 13

| Binder | 12 |
| Fiber | 2 |
| Lubricant | 0 |
| Total Abrasives | 15 |
| Titanates | 10 |
| Fillers | 61 |
| Copper and Copper alloys | 0 |
| Total | 100 |

The friction material Example 13 is the inverse of Example 12 and had the lowest level of all ingredients studied in previous examples and the highest of the other materials. This material had the lowest cost of all formulations, which is to be expected as the filler materials typically are cheaper than the other ingredients in the formulation. The material processed fairly well, and had average friction characteristics. However, the brake pads were very soft with high compressibility values. Further, the bond strength of the friction material to the backplate was poor. The range of friction coefficient was the second highest, as this formulation also had the lowest level of titanates among the examples described here. It is believed to be virtually impossible to overcome all these negatives by choosing the correct abrasive, correct titanate, best fiber and the correct binder system, all while keeping the high level of filler materials. Thus, the other ingredients in the friction formulation has to be well below the 61%, and preferably below 45%.

The foregoing description discloses exemplary embodiments of the present invention. One skilled in the art will readily recognize from this description, and from the accompanying drawings and claims that various changes, modifications and variations can be made without departing from the spirit and scope of the invention as defined by the claims.

What is claimed is:

1. A friction material for a brake comprising:
   at least one binder forming approximately 15-20% by volume;
   at least one fiber forming 3-8% by volume;
   at least one lubricant forming less than 5% by volume;
   at least one abrasives forming 17-25% by volume;
   at least one titanate forming at least 13% by volume;
   other materials forming 29-45% by volume; and wherein the friction material is substantially free of asbestos and copper.

2. The friction material of claim 1 wherein said binder consists essentially of a modified phenolic resin.

3. The friction material of claim 1 wherein said binder comprises a mixture of one or more straight or modified phenolic resin systems.

4. The friction material of claim 1 wherein said binder is not a phenolic resin.

5. The friction material of claim 1 wherein said binder is a mixture of a phenolic resin and a nonphenolic resin.

6. The friction material of claim 1 wherein said fiber is chosen from a group of aramid, polyacrylonitrile (PAN) and cellulose fibers.

7. The friction material of claim 1 wherein said lubricant consists essentially of at least one of metal sulfides, organic lubricants and metal lubricants.

8. The friction material of claim 7 wherein said lubricant is selected from the group consisting essentially of tin sulfides, antimony trisulfide, antimony trioxide, zinc sulfide, copper sulfide, iron sulfides, phthalocyanine, tin powder, and zinc powder.

9. The friction material of claim 7 wherein said lubricant comprises a metal sulfide complex.

10. The friction material of claim 7 wherein said lubricant comprises a combination of a metal sulfide and antimony trisulfide.

11. The friction material of claim 7 wherein said lubricant comprises only antimony trisulfide.

12. The friction material of claim 1 wherein said abrasives are chosen from a group of mineral fibers, zirconia, zircon, zirconium silicate, mica, alumina, ceramic fibers, calcium magnesium silicate, calcium magnesium zirconium silicate, calcium magnesium aluminum silicate, magnesium aluminum silicate, synthetic mineral fibers, silica, silicon dioxide, sand, silicon carbide, iron oxide and Magnesium oxide.

13. The friction material of claim 1 wherein said abrasives consist essentially of at least one of zirconia and zirconium silicate.

14. The friction material of claim 1 wherein said abrasives consist essentially of at least one of iron oxide and magnesium oxide.

15. The friction material of claim 1 wherein said abrasives consist essentially at least one of mineral fibers and alumina.

16. The friction material of claim 1 including less than 10% magnesium oxide.

17. The friction material of claim 1 including less than 5% magnesium oxide.

18. The friction material of claim 1 including less than 2.2% magnesium oxide.

19. The friction material of claim 1 wherein said material is substantially free of magnesium oxide.

20. The friction material of claim 1 wherein said other materials comprise at least one selected from the group consisting of lime, calcium oxide, talc, calcium carbonate, wollastonite, barites, calcium silicate, carbons, friction dust.

21. The friction material of claim 1 wherein said other materials consist essentially of a mixture of wollastonite, lime, barium sulfate, graphite, and friction dusts.

22. The friction material of claim 1 wherein said other materials consist essentially of a mixture of wollastonite, lime, barium sulfate, graphite, rubber, and friction dusts.

23. The friction material of claim 1 wherein the friction material does not include copper, brass, bronze and other copper alloys.

24. The friction material of claim 1 wherein said binder is an unmodified phenolic resin.

25. The friction material of claim 1 wherein said fiber is a fiber of the aramid fiber family only.

26. The friction material of claim 1 that contains substantially no copper in any form.

27. The friction material of claim 1 wherein said friction material is substantially tree of magnesium oxide.

28. The friction material of claim 1 wherein the friction material is substantially free of steel fibers.

29. The friction material of claim 1 wherein
   said binder consists essentially of at least one of a straight phenolic resin, a modified phenolic resin, silicone, acrylic, epoxy, and nitrile;

said fiber consists essentially of at least one of aramid fibers, poly acrylonitrile (PAN) fibers, and cellulose fibers;

said lubricant consists essentially of at least one of tin sulfides, atimony trisulfide, antimony trioxide, zinc sulfide, copper sulfide, iron sulfides, phthalocyanine, tin powder, and zinc powder; and said abrasive consists essentially of at least one of mineral fibers, zirconia, alumina, magnesium oxide, zirconium silicate, silica, silicon dioxide, sand, silicon carbide, mullite, iron oxide, complex mineral silicates such as calcium magnesium silicate, calcium magnesium zirconium silicate, calcium magnesium aluminum silicate, magnesium aluminum silicate, iron oxides of different chemistries, metallic oxides, synthetic mineral fibers, hardwool, slagwool, rockwool, and naturally occurring minerals.

30. The friction material of claim 29 wherein said titanate consists essentially of at least one of hexatitanate and octatitanate.

31. The friction material of claim 30 wherein said other materials consist essentially of at least one of lime, calcium oxide, barytes, graphite, pet coke, desulfurized coke, calcium silicate, powder rubber, recycled rubber, and friction dust.

32. The friction material of claim 1 wherein said titanate consists essentially of at least one of hexatitanate and octatitanate.

33. A brake pad comprising: a backing plate; and a friction pad fixed to the backing plate and fabricated of a friction material, wherein the friction material comprises
- at least one binder forming approximately 15-20% by volume;
- at least one fiber forming 3-8% by volume;
- at least one lubricant forming less than 5% by volume;
- at least one abrasives forming 17-25% by volume;
- at least one titanate forming at least 13% by volume;
- other materials forming 29-45% by volume; and wherein the friction material is substantially free of asbestos, copper and magnesium oxide.

* * * * *

US008172051C1

(12) EX PARTE REEXAMINATION CERTIFICATE (9673rd)
United States Patent
Subramanian

(10) Number: US 8,172,051 C1
(45) Certificate Issued: May 21, 2013

(54) FRICTION MATERIAL FOR BRAKES

(75) Inventor: Vijay Subramanian, Murfeesboro, TN (US)

(73) Assignee: Federal-Mogul Products, Inc., Southfield, MI (US)

Reexamination Request:
No. 90/012,570, Sep. 14, 2012

Reexamination Certificate for:
Patent No.: 8,172,051
Issued: May 8, 2012
Appl. No.: 12/245,253
Filed: Oct. 3, 2008

(51) Int. Cl.
*F16D 69/00* (2006.01)

(52) U.S. Cl.
USPC .................. 188/251 M; 188/215 A

(58) Field of Classification Search
None
See application file for complete search history.

(56) References Cited

To view the complete listing of prior art documents cited during the proceeding for Reexamination Control Number 90/012,570, please refer to the USPTO's public Patent Application Information Retrieval (PAIR) system under the Display References tab.

*Primary Examiner* — Matthew C. Graham

(57) ABSTRACT

A non-asbestos friction material includes at least one binder, fiber, lubricant, abrasive and titanate in a range of volume fractions in combination with other materials such as fillers and is substantially free of copper and asbestos.

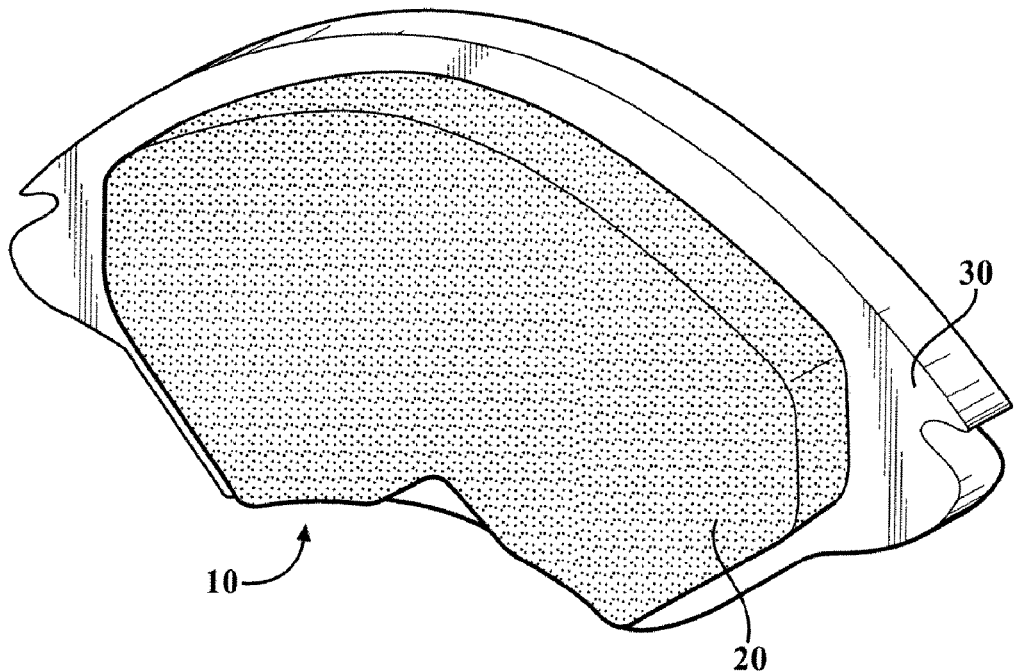

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-33 is confirmed.

* * * * *